(12) United States Patent
Flemming et al.

(10) Patent No.: US 8,024,738 B2
(45) Date of Patent: Sep. 20, 2011

(54) METHOD AND SYSTEM FOR DISTRIBUTING UNUSED PROCESSOR CYCLES WITHIN A DISPATCH WINDOW

(75) Inventors: Diane Garza Flemming, Pflugerville, TX (US); Octavian Florin Herescu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1426 days.

(21) Appl. No.: 11/467,222

(22) Filed: Aug. 25, 2006

(65) Prior Publication Data

US 2008/0052713 A1 Feb. 28, 2008

(51) Int. Cl.
*G06F 9/46* (2006.01)
*G06F 15/173* (2006.01)
*G06F 13/00* (2006.01)

(52) U.S. Cl. ........ 718/104; 718/105; 709/224; 709/226; 711/153; 711/173

(58) Field of Classification Search .................. None
See application file for complete search history.

(56) References Cited

U.S. PATENT DOCUMENTS

| | | | |
|---|---|---|---|
| 6,714,960 B1 * | 3/2004 | Bitar et al. ................ | 718/103 |
| 6,851,030 B2 * | 2/2005 | Tremaine ................. | 711/160 |
| 6,957,435 B2 | 10/2005 | Armstrong et al. | |
| 7,062,559 B2 * | 6/2006 | Yoshimura et al. ........ | 709/226 |
| 7,093,250 B1 * | 8/2006 | Rector ..................... | 718/100 |
| 7,096,469 B1 * | 8/2006 | Kubala et al. ............ | 718/100 |
| 7,103,809 B2 * | 9/2006 | Schlangen ................ | 714/47 |
| 7,143,413 B2 * | 11/2006 | McCarthy et al. ......... | 718/104 |
| 7,219,347 B1 * | 5/2007 | Waddington .............. | 718/104 |
| 7,620,661 B2 | 11/2009 | Mehaffy et al. | |
| 7,665,090 B1 * | 2/2010 | Tormasov et al. ......... | 718/104 |
| 2002/0156824 A1 * | 10/2002 | Armstrong et al. ........ | 709/104 |
| 2003/0037092 A1 * | 2/2003 | McCarthy et al. ......... | 709/104 |
| 2003/0088608 A1 * | 5/2003 | McDonald ................ | 709/106 |
| 2004/0010788 A1 * | 1/2004 | Cota-Robles et al. ...... | 718/1 |
| 2004/0168170 A1 * | 8/2004 | Miller ..................... | 718/104 |
| 2004/0226015 A1 * | 11/2004 | Leonard et al. ........... | 718/100 |
| 2006/0123217 A1 * | 6/2006 | Burdick et al. ........... | 711/173 |
| 2006/0123423 A1 * | 6/2006 | Brenner ................... | 718/105 |
| 2006/0136695 A1 * | 6/2006 | Vaupel .................... | 711/173 |
| 2007/0136721 A1 | 6/2007 | Flemming et al. | |
| 2007/0150894 A1 * | 6/2007 | Barsness et al. .......... | 718/100 |
| 2007/0169127 A1 * | 7/2007 | Kashyap .................. | 718/104 |

* cited by examiner

*Primary Examiner* — Meng A An
*Assistant Examiner* — Abdullah Al Kawsar
(74) *Attorney, Agent, or Firm* — Yee & Associates, P.C.; Justin M. Dillon (57) ABSTRACT

A system for managing processor cycles. A set of uncapped partitions are identified that are ready-to-run in response to unused processor cycles being present in a dispatch window. A number of candidate partitions are identified from the identified set of uncapped partitions based on a history of usage where each identified partition used at least 100 percent of its entitlement in a predefined number of previous dispatch windows. Then, a partition is selected from the number of candidate partitions based on a lottery process of the candidate partitions.

20 Claims, 6 Drawing Sheets

HISTORY-BASED
PRIORITIZATION
ALGORITHM

1201 { Compile list of all uncapped partitions in dispatch window.

1202 { Create a table with the number of table entries equal to the number of dispatch windows that are considered for the entitlement usage history for each uncapped partition. A system administrator programs the number of dispatch windows that are considered for the entitlement usage history. Use default number of entries if the system administrator does not program this number. Update the entitlement usage history table every dispatch window cycle.

1203 { Compare list of all uncapped partitions to list of ready-to-run uncapped partitions in this dispatch window.

1204 { Calculate average entitlement usage of each uncapped partition listed in both the list of all uncapped partitions and the list of ready-to-run uncapped partitions over the programmed or default number of dispatch windows. If the calculated average entitlement usage for an uncapped partition is greater than or equal to 100%, then place the uncapped partition into the candidate list.

1205 { Apply lottery scheme to candidate list and dispatch the winner to consume the unused processor cycles in the dispatch window. If no candidate is found in the candidate list, then apply lottery scheme to the list of all uncapped partitions.

METHOD AND SYSTEM FOR DISTRIBUTING UNUSED PROCESSOR CYCLES WITHIN A DISPATCH WINDOW

BACKGROUND OF THE INVENTION

1. Field of the Invention

The present invention relates generally to an improved data processing system. More specifically, the present invention is directed to a computer implemented method, system, and computer usable program code to dynamically distribute unused processor cycles within a dispatch window.

2. Description of the Related Art

A modern computer system typically comprises a central processing unit (CPU) and supporting hardware necessary to store, retrieve, and transfer information, such as communications busses and memory. It also includes, for example, hardware necessary to communicate with the outside world, such as input/output controllers or storage controllers and devices attached thereto, such as keyboards, monitors, tape drives, disk drives, and communication lines coupled to a network. The CPU is the heart of the computer system. The CPU executes instructions, which comprise a computer program, and directs the operation of the other computer system components.

Fundamentally, most computer systems operate in the same manner in that the CPU is only capable of performing a limited set of very simple operations, such as arithmetic, logical comparisons, and movement of data from one location to another. Programs may direct a CPU to perform massive numbers of these simple operations, but each operation must be performed very quickly. Therefore, improvements to computer systems require that these systems be made ever faster.

The overall speed of a computer system, which is also called the throughput, may be measured as the number of operations performed per unit of time. Without changing the computer system's clock speed, it is possible to improve throughput by using multiple copies of certain computer components, and in particular, by using multiple processors. The modest cost of individual processors and other components packaged on integrated circuit chips has made this practical. As a result, many current large-scale computer system designs include multiple processors, caches, buses, I/O drivers, storage devices, and so forth.

One recent development in response to increased system complexity is logical partitioning of the various resources of a large computer system. A logical partition (LPAR) is a logical segmentation of the computer system's processor(s), memory, and other resources that allows the logical partition to run its own copy of an operating system and associated applications. Conceptually, logical partitioning means that multiple discrete partitions are established within the computer system and the computer system's resources are assigned to respective partitions. Each operation executes within a logical partition, which means that the operation may only use the resources assigned to that partition and not any resources assigned to other partitions. This creation of logical partitions within the computer system is known as a "virtual environment."

Generally, logical partitions are created by a system administrator or user with similar authority. Creation of the partition is performed by issuing commands to appropriate management software resident on the computer system, rather than physical reconfiguration of hardware components. It is expected, and indeed one of the benefits of logical partitioning, that the system administrator may re-allocate system resources in response to changing needs or improved understanding of the computer system's performance.

Presently, partitions are either dedicated processor partitions or shared processor partitions. A system administrator using a dedicated processor partition scheme within the computer system assigns processors in increments of one full processor to a partition. A system administrator using a shared processor partition scheme assigns one increment, or a "slice," of one full processor to a partition, which is known as micro-partitioning.

There are two types of micro-partitions, namely "capped" and "uncapped." A capped partition is not allowed to exceed its time entitlement, whereas an uncapped partition is allowed to exceed its time entitlement. A time entitlement is a given number of processing units, or CPU cycles, assigned by the system administrator to a particular partition. A capped partition indicates that the partition will never exceed its assigned processing capacity. The system administrator may use a capped partition if the system administrator knows that an operation will never require more than a certain amount of processing capacity.

In a virtualized environment, a partition is guaranteed full use of the partition's time entitlement within a dispatch window, which may be, for example, 10 milliseconds (ms). A dispatch window defines a period during which operations are allowed to start. Any unused portion of the dispatch window is redistributed to the uncapped partitions within the computer system. The current redistribution method is somewhat random in that computer systems use a standard lottery scheduling policy. The problem with this standard lottery scheduling redistribution method is that it does not give preferential treatment to the busiest uncapped partitions.

A partition is only dispatched when the partition has work to do. Until the partition is dispatched, the partition is placed in a queue. The queue only contains ready-to-run partitions or partitions waiting on an interrupt.

The standard lottery scheduling redistribution method is based on a predefined, static weight associated with the uncapped partitions. The system administrator assigns a partition's weight at the time the partition is created. The partition's weight may be, for example, between 0 and 127. The higher the partition's weight, the more likely the partition is granted the unused CPU cycles. But, standard lottery scheduling based on partition weight does not take into account the possible cyclical load behavior in a partition or the partition's past usage history. One method to deal with this cyclical load behavior is to increase the weight associated with the partition when the load is high. However, the weight is static, set at partition creation time, and the only way to change the weight in some virtualized environments is to stop and restart the partition. Additionally, by increasing the partition's weight, the partition stands a higher chance of being dispatched even though the recent history of the partition may show that the partition is not very busy.

Another possible method for favoring the busiest uncapped partition is to use a load balancer. However, this load balancer method involves higher processor overhead and is CPU intensive. Also, using a load balancing application on top of firmware to prioritize partitions may involve duplication of work and resources.

Therefore, it would be beneficial to have a computer implemented method, system, and computer useable program code for dynamically distributing unused processor cycles within a dispatch window to the busiest uncapped partitions when partitions experience high loads at different times throughout the day, thereby avoiding the dispatch of less busy partitions.

SUMMARY OF THE INVENTION

Illustrative embodiments provide a computer implemented method, system, and computer useable program code for managing processor cycles. In response to unused processor cycles being present in a dispatch window, a set of uncapped partitions are identified that are ready-to-run. Then, a number of candidate partitions are identified from the identified set of uncapped partitions based on a history of usage where each identified partition used at least 100 percent of its entitlement in a predefined number of previous dispatch windows. Finally, a partition is selected from the number of candidate partitions based on a lottery process of the candidate partitions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
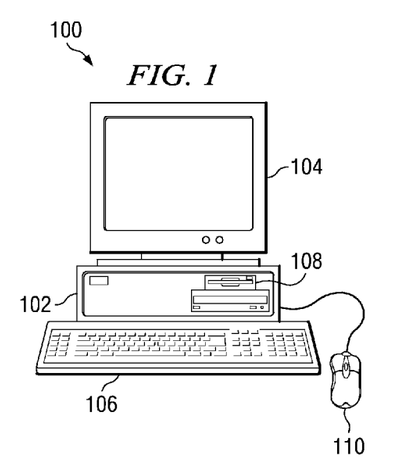
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
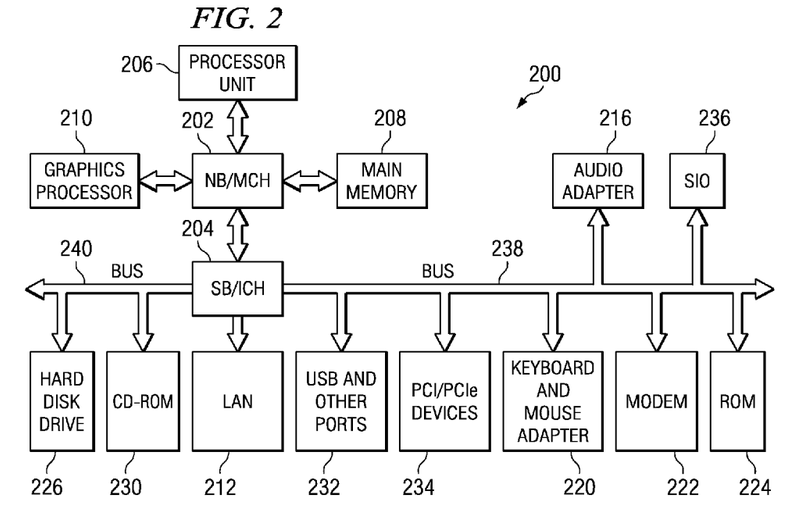
FIG. 2 is a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206. This operating system coordinates and controls various components within data processing system 200 in FIG. 2. The operating system may be a commercially available operating system, such as Advanced Interactive Executive (AIX®), which is available from International Business Machines Corporation in Armonk, N.Y. An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processor 206. The processes of the illustrative embodiments may be performed by processor 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, system, and computer usable program code for compiling source code and for executing code. The methods described with respect to the depicted embodiments may be performed in a data processing system, such as data processing system 100 shown in FIG. 1 or data processing system 200 shown in FIG. 2.

Illustrative embodiments provide a computer implemented method, system, and computer useable program code within a data processing system for dynamically distributing unused processor cycles within a dispatch window to the busiest uncapped micro-partitions. The data processing system uses a partition management firmware to manage the capped and uncapped micro-partitions. The partition management firmware may utilize, for example, an algorithm to perform the steps of distributing the unused processor cycles within the dispatch window to the uncapped micro-partitions.

In response to determining that time remains in the dispatch window after all logical micro-partitions, both capped and uncapped, use their minimum entitlement of processor cycles, the partition management firmware compiles a list of all uncapped micro-partitions and a list of all ready-to-run uncapped micro-partitions. However, it is possible for a logical micro-partition not to use all of its minimum entitlement of processor cycles within the dispatch window. A logical micro-partition may cede its entitlement of processor cycles.

In the context of this specification, cede means to relinquish control over all or part of a logical micro-partition's entitlement and to grant that entitlement to another logical micro-partition. For example, even though a logical micro-partition's entitlement may still have time remaining within the dispatch window, the logical micro-partition may not be able to perform or make progress on a task because the logical micro-partition is waiting on an interrupt or some other external event. Consequently, the logical micro-partition may cede its entitlement of processor cycles to another logical micro-partition while sitting idle, rather than "holding on" to the processor cycles.

After compiling the list of all uncapped micro-partitions and the list of all ready-to-run uncapped micro-partitions, the partition management firmware compares the two lists. Subsequent to comparing the two lists, the partition management firmware calculates an average entitlement usage for each uncapped micro-partition listed in both the list of all uncapped micro-partitions and the list of ready-to-run uncapped micro-partitions.

The partition management firmware uses a programmable number of dispatch window cycle entries for all uncapped partitions within an entitlement history table to calculate the average entitlement usage. The entitlement history table is a table that lists the number of processor cycles each uncapped micro-partition uses over a predetermined number of dispatch window cycles. The purpose of the entitlement history is to determine whether each micro-partition has a pattern of high load.

A system administrator programs the number of dispatch window cycle entries the entitlement history table will contain. The average entitlement usage is a calculation of the average of all the entries contained in the entitlement history table for an uncapped micro-partition. If the calculated average entitlement usage is greater than or equal to a threshold, such as, for example, 100% usage, for an uncapped micro-partition, then the partition management firmware adds that particular uncapped micro-partition to a candidate list.

Subsequently, the partition management firmware applies a history-based lottery process to the candidate list. The history-based lottery process takes into account the calculated average entitlement usage and the system administrator assigned weight of the uncapped micro-partition. Consequently, the partition management firmware uses the calculated average entitlement usage and the assigned weight for the candidate uncapped micro-partition to determine a winner of the history-based lottery from the candidate list. Afterward, the partition management firmware dispatches the winning candidate, thereby dynamically distributing the unused processor cycles within the dispatch window. If the candidate list only lists one candidate, then the partition management firmware dispatches that one uncapped micro-partition candidate without using a lottery process. Subsequent to dispatching a candidate, the partition management firmware removes that dispatched candidate from the candidate list.

If no uncapped micro-partitions are listed in the candidate list, the partition management firmware applies a standard lottery process to the list of all uncapped micro-partitions. The standard lottery process only takes into account the system administrator assigned weight of the uncapped micro-partition. Afterward, the partition management firmware dispatches the winner of the standard lottery from the list of all uncapped micro-partitions to dynamically distribute the unused processor cycles within the dispatch window.

Subsequent to dispatching an uncapped micro-partition to utilize the unused processor cycles, the partition management firmware determines if time still remains within the dispatch window. If time still remains within the dispatch window, then the partition management firmware once again applies either the history-based or standard lottery process to either the candidate list or the list of all uncapped micro-partitions, respectively, to dispatch another winner to consume more unused processor capacity. In addition, the partition management firmware updates the entitlement history table for all uncapped micro-partitions prior to the beginning of every dispatch window cycle.

By implementing an algorithm within the partition management firmware to perform the steps of dynamically distributing unused processor cycles, the partition management firmware becomes more efficient because the partition management firmware already implements the list of all uncapped micro-partitions, the list of all ready-to-run micro-partitions, and the standard lottery process. In addition, the algorithm gives preferential treatment to the busiest uncapped micro-partitions. Further, by not impacting the minimum guaranteed entitlement for every micro-partition within a dispatch window, the algorithm does not starve any micro-partition while favoring the busiest uncapped micro-partitions. Thus, illustrative embodiments efficiently and dynamically distribute unused processor cycles within a dispatch window by using a history-based prioritization algorithm.

Figure 3:
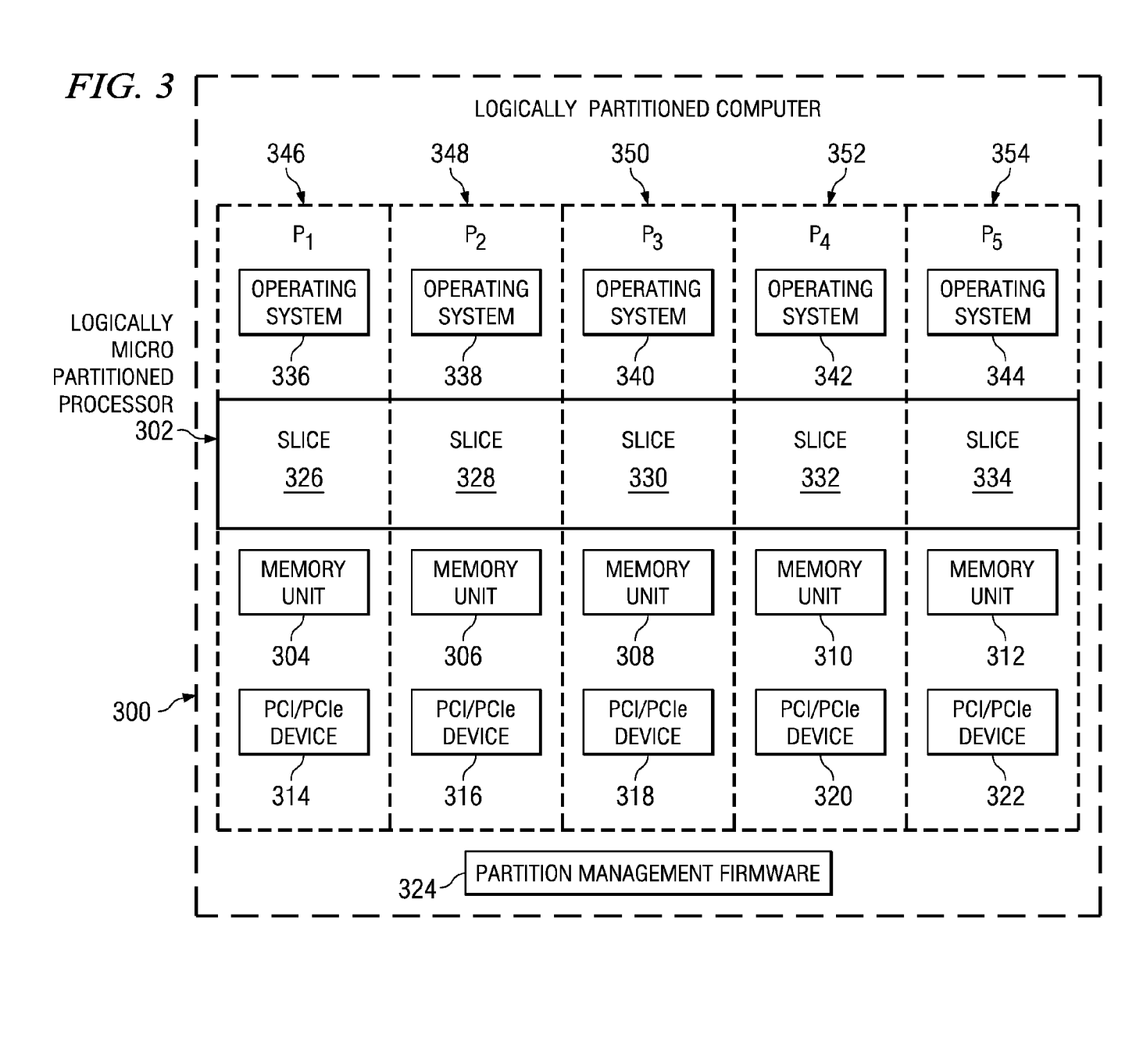
FIG. 3 is a block diagram of a logically partitioned computer in accordance with illustrative embodiments.

With reference now to FIG. 3, a block diagram of a logically partitioned computer is depicted in accordance with illustrative embodiments. Logically partitioned computer 300 may, for example, be implemented by data processing system 200 in FIG. 2. Logically partitioned computer 300 may include, for example, logically micro-partitioned processor 302, memory units 304, 306, 308, 310, and 312, PCI/PCIe devices 314, 316, 318, 320, and 322, and partition management firmware 324. However, it should be noted that logically partitioned computer 300 is only intended for exemplary purposes and not meant as an architectural limitation for illustrative embodiments. Logically partitioned computer 300 may include any necessary components to perform processes of illustrative embodiments.

Logically micro-partitioned processor 302 may be, for example, processor unit 206 in FIG. 2. However, it should be noted that logically partitioned computer 300 may include a symmetric multiprocessor (SMP) system, which comprises a plurality of logically micro-partitioned processors. Logically micro-partitioned processor 302 includes micro-partition slices 326, 328, 330, 332, and 334. Micro-partition slices 326, 328, 330, 332, and 334 represent "slices" of processor capacity, or a specified numbers of processor cycles, within logically micro-partitioned processor 302. Each slice of processor capacity is capable of performing tasks or operations for logically partitioned computer 300.

Because logically partitioned computer 300 is logically partitioned, multiple operating systems, such as operating systems 336, 338, 340, 342, and 344 may simultaneously run on logically partitioned computer 300. Operating systems 336, 338, 340, 342, and 344 may, for example, be heterogeneous operating systems, multiple instances of a single operating system, or a combination thereof. Each of these multiple operating systems may have any number of software applications executing within them. Also, each of these multiple operating systems are individually assigned to a separate, non-overlapping set of logically partitioned hardware.

For example, logically partitioned computer 300 has five micro-partitions, $P_1$ 346, $P_2$ 348, $P_3$ 350, $P_4$ 352, and $P_5$ 354. However, those of ordinary skill in the art will appreciate that logically partitioned computer 300 may contain more or fewer logical micro-partitions. In addition, each of memory units 304, 306, 308, 310, and 312, PCI/PCIe devices 314, 316, 318, 320, and 322, and processor slices 326, 328, 330, 332, and 334 are assigned to different logical micro-partitions. Memory units 304, 306, 308, 310, and 312 may be, for example, main memory 208, ROM 224, CD-ROM 230, hard disk drive 226, or any combination thereof, in FIG. 2. PCI/PCIe devices 314, 316, 318, 320, and 322 may be, for example, PCI/PCIe devices 234 in FIG. 2. However, illustrative embodiments are not restricted to only logically partitioning memory units, PCI/PCIe devices, and processor slices. Illustrative embodiments may include within a logical micro-partition any necessary data processing system components.

In this exemplary illustration, logical micro-partition $P_1$ 346 includes memory unit 304, PCI/PCIe device 314, processor slice 326, and operating system 336. Logical micro-partition $P_2$ 348 includes memory unit 306, PCI/PCIe device 316, processor slice 328, and operating system 338. Logical micro-partition $P_3$ 350 includes memory unit 308, PCI/PCIe device 318, processor slice 330, and operating system 340. Logical micro-partition $P_4$ 352 includes memory unit 310, PCI/PCIe device 320, processor slice 332, and operating system 342. Logical micro-partition $P_5$ 354 includes memory unit 312, PCI/PCIe device 322, processor slice 334, and operating system 344. However, it should be noted that even though logical micro-partitions $P_1$ 346, $P_2$ 348, $P_3$ 350, $P_4$ 352, and $P_5$ 354 include one memory unit, one PCI/PCIe device, and one processor slice, illustrative embodiments are not limited to such. Illustrative embodiments may include a plurality of memory units, a plurality of PCI/PCIe devices, a plurality of processor slices, or any combination thereof, within one logical micro-partition.

As shown above, each operating system executing within logically partitioned computer 300 is assigned to a different logical micro-partition. Consequently, each operating system may only access those hardware components within its logical micro-partition. In addition, for example, one instance of the AIX® operating system may be executing within micro-partition $P_1$ 346. A second instance, or image, of the AIX® operating system may be executing within micro-partition $P_2$ 348. A Linux operating system may be operating within micro-partition $P_3$ 350. Linux is a version of Unix, which is an open source software operating system. A second instance of the Linux operating system may be operating within micro-partition $P_4$ 352. Finally, an instance of a Windows XP® operating system, which is a product available from the Microsoft® Corporation, may be executing within micro-partition $P_5$ 354.

As a result, an error occurring in a PCI/PCIe device in one micro-partition is not "seen" by an operating system within another micro-partition. Consequently, the integrity of an operating system in one micro-partition is not affected by an error occurring in another logical micro-partition. Without such isolation of errors, an error occurring within a PCI/PCIe device of one micro-partition may cause the operating system or software applications of another micro-partition to cease to operate or to cease operating correctly.

Management of logical micro-partitions $P_1$ 346, $P_2$ 348, $P_3$ 350, $P_4$ 352, and $P_5$ 354 is achieved through partition management firmware 324. Firmware is a category of memory chips that hold their content without electrical power. Firmware includes flash, ROM, programmable ROM (PROM), erasable programmable ROM (EPROM), electrically erasable programmable ROM (EEPROM), and nonvolatile random access memory (NVRAM) technologies. When holding program instructions, firmware can be thought of as "hard software." Partition management firmware 324 may, for example, be a POWER Hypervisor™, which is a product available from the IBM® Corporation. The POWER Hypervisor™ is a firmware layer that runs underneath the AIX® and Linux operating systems. The main function of partition management firmware 324 is to handle time slicing and dispatching of micro-partitions $P_1$ 346, $P_2$ 348, $P_3$ 350, $P_4$ 352, and $P_5$ 354 within logically partitioned computer 300. The number of processor cycles a logical micro-partition receives is determined by the system administrator. This number of processor cycles for the logical micro-partition becomes the "entitlement" for the logical micro-partition.

Figure 4:
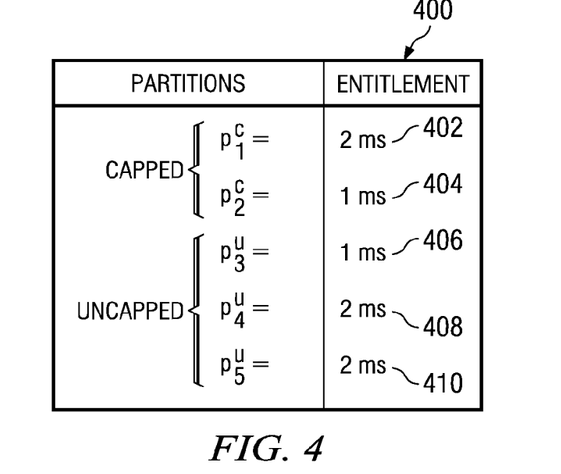
FIG. 4 is an exemplary list of all capped and uncapped micro-partitions within a computer, along with their respective entitlements, in accordance with illustrative embodiments.

With reference now to FIG. 4, an exemplary list of all capped and uncapped micro-partitions within a computer, along with their respective entitlements, is depicted in accordance with illustrative embodiments. Micro-partition list 400 lists all logical micro-partitions within a logically partitioned computer, such as, for example, logical micro-partitions $P_1$ 346, $P_2$ 348, $P_3$ 350, $P_4$ 352, and $P_5$ 354 within logically partitioned computer 300 in FIG. 3. Micro-partition list 400 includes both capped and uncapped logical micro-partitions. Micro-partitions $P_1$ 402 and $P_2$ 404 are capped logical partitions, which means that micro-partitions $P_1$ 402 and $P_2$ 404 never exceed their entitlement, or assigned processing capacity, during a dispatch window cycle. Capped micro-partitions $P_1$ 402 and $P_2$ 404 may be, for example, micro-partitions $P_1$ 346 and $P_2$ 348 in FIG. 3. Micro-partitions $P_3$ 406, $P_4$ 408, and $P_5$ 410 are uncapped logical partitions, which means that micro-partitions $P_3$ 406, $P_4$ 408, and $P_5$ 410 may exceed their entitlement during a dispatch window cycle. Uncapped micro-partitions $P_3$ 406, $P_4$ 408, and $P_5$ 410 may be, for example, logical micro-partitions $P_3$ 350, $P_4$ 352, and $P_5$ 354 in FIG. 3.

Capped micro-partitions $P_1$ 402 and $P_2$ 404 are assigned an entitlement of 2 ms and 1 ms, respectively. In other words, capped micro-partition $P_1$ 402 cannot exceed its 2 ms entitlement and capped micro-partition $P_2$ 404 cannot exceed its 1 ms entitlement within a dispatch window cycle. Uncapped micro-partitions $P_3$ 406, $P_4$ 408, and $P_5$ 410 are assigned an entitlement of 1 ms, 2 ms, and 2 ms, respectively. In other words, uncapped micro-partition $P_3$ 406 may exceed its 1 ms entitlement, uncapped micro-partition $P_4$ 408 may exceed its 2 ms entitlement, and uncapped micro-partition $P_5$ 410 may exceed its 2 ms entitlement within a dispatch window if micro-partitions $P_3$ 406, $P_4$ 408, and $P_5$ 410 use at least 100% of their respective entitlements during the dispatch window cycle. In addition, it should be noted that all capped and uncapped partitions within the micro-partitioned processor receive their respective minimum entitlement each dispatch window cycle prior to any uncapped partition becoming eligible to receive additional processor cycles.

Of course, those of ordinary skill in the art should appreciate that micro-partition list 400 is only shown for illustration purposes and is not intended to imply limitations on illustrative embodiments. Illustrative embodiments may include the same, more, or fewer logical micro-partitions within a logically partitioned computer. In addition, illustrative embodiments may include any ratio of capped to uncapped micro-partitions. Further, illustrative embodiments may allocate any size entitlement to each micro-partition. Furthermore, each micro-partition may include the same entitlement, a different entitlement, or any combination of the same and different entitlements within the logically partitioned computer. Moreover, illustrative embodiments may include a plurality of micro-partitioned processors, each with a plurality of capped and uncapped micro-partitions, within the logically partitioned computer.

Figure 5:
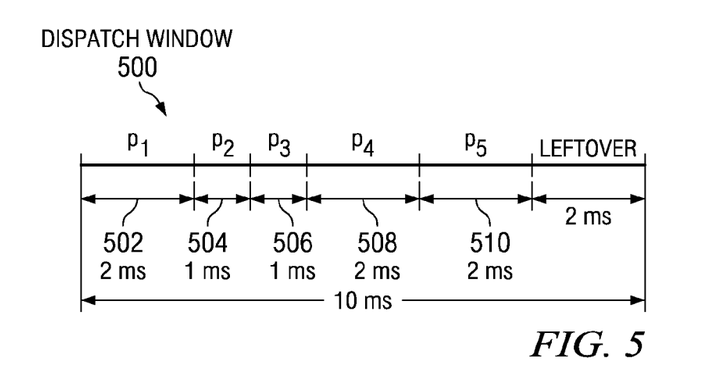
FIG. 5 is an exemplary illustration of a dispatch window with unused processor cycles in accordance with illustrative embodiments.

With reference now to FIG. 5, an exemplary illustration of a dispatch window with unused processor cycles is depicted in accordance with illustrative embodiments. Dispatch window 500 is 10 ms in duration. However, dispatch window 500 is only shown for illustration purposes and is not intended as a restriction on illustrative embodiments. Dispatch window 500 may be any duration suitable for processes of illustrative embodiments, such as, for example, 1 ms-20 ms in duration.

A partition management firmware, such as partition management firmware 324 in FIG. 3, uses dispatch window 500 to dispatch micro-partitions to consume processor cycles to perform tasks. In this particular illustrative example, the partition management firmware dispatches micro-partitions $P_1$ 502, $P_2$ 504, $P_3$ 506, $P_4$ 508, and $P_5$ 510, such as micro-partitions $P_1$ 346, $P_2$ 348, $P_3$ 350, $P_4$ 352, and $P_5$ 354 in FIG. 3, to consume processor cycles to perform tasks. Micro-partitions $P_1$ 502, $P_2$ 504, $P_3$ 506, $P_4$ 508, and $P_5$ 510 have entitlements of 2 ms, 1 ms, 1 ms, 2 ms, and 2 ms, respectively, such as micro-partitions $P_1$ 402, $P_2$ 404, $P_3$ 406, $P_4$ 408, and $P_5$ 410 in FIG. 4. In addition, micro-partitions $P_1$ 502 and $P_2$ 504 are capped and micro-partitions $P_3$ 506, $P_4$ 508, and $P_5$ 510 are uncapped, such as capped micro-partitions $P_1$ 402 and $P_2$ 404 and uncapped micro-partitions $P_3$ 406, $P_4$ 408, and $P_5$ 410 in FIG. 4.

Also in this particular illustrative example, micro-partitions $P_1$ 502, $P_2$ 504, $P_3$ 506, $P_4$ 508, and $P_5$ 510 consume 100% of the respective entitlements. However, this 100% entitlement consumption is only a total of 8 ms. Consequently, because dispatch window 500 is 10 ms in duration and only 8 ms of processor capacity, or processor cycles, were consumed by the dispatch of micro-partitions $P_1$ 502, $P_2$ 504, $P_3$ 506, $P_4$ 508, and $P_5$ 510, 2 ms of processor capacity is unused, or leftover, within dispatch window 500.

Since only uncapped micro-partitions are capable of consuming additional processor cycles, the partition management firmware only considers uncapped micro-partitions $P_3$ 506, $P_4$ 508, and $P_5$ 510 for eligibility to consume the additional processor cycles. Further, because uncapped micro-partitions $P_3$ 506, $P_4$ 508, and $P_5$ 510 consumed 100% of their respective entitlement of processor capacity, all three uncapped micro-partitions are eligible to receive more processor time. Because more than one uncapped micro-partition is eligible to receive more processor capacity, the partition management firmware applies an entitlement history usage based lottery scheme to determine a winner to receive the additional processor cycles. Thus, the partition management firmware rewards the busiest uncapped micro-partitions by providing additional processing time.

Figure 6:
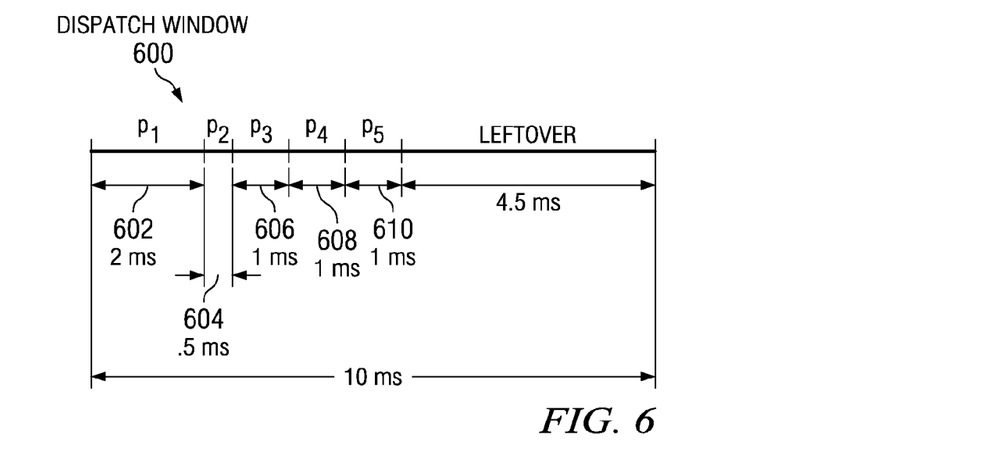
FIG. 6 is another exemplary illustration of a dispatch window with unused processor cycles in accordance with illustrative embodiments.

With reference now to FIG. 6, another exemplary illustration of a dispatch window with unused processor cycles is depicted in accordance with illustrative embodiments. Dispatch window 600 also is 10 ms in duration, such as dispatch window 500 in FIG. 5. In this particular illustrative example, the partition management firmware dispatches micro-partitions $P_1$ 602, $P_2$ 604, $P_3$ 606, $P_4$ 608, and $P_5$ 610, such as micro-partitions $P_1$ 502, $P_2$ 504, $P_3$ 506, $P_4$ 508, and $P_5$ 510 in FIG. 5, to perform tasks. Micro-partitions $P_1$ 602, $P_2$ 604, $P_3$ 606, $P_4$ 608, and $P_5$ 610 also have entitlements of 2 ms, 1 ms, 1 ms, 2 ms, and 2 ms, respectively, such as micro-partitions $P_1$ 402, $P_2$ 404, $P_3$ 406, $P_4$ 408, and $P_5$ 410 in FIG. 4. In addition, micro-partitions $P_1$ 602 and $P_2$ 604 are capped and micro-partitions $P_3$ 606, $P_4$ 608, and $P_5$ 610 are uncapped, such as capped micro-partitions $P_1$ 402 and $P_2$ 404 and uncapped micro-partitions $P_3$ 406, $P_4$ 408, and $P_5$ 410 in FIG. 4.

Also, in this particular illustrative example, capped micro-partition $P_1$ 602 and uncapped micro-partition $P_3$ 606 consume 100% of the respective entitlements, whereas capped micro-partition $P_2$ 604 and uncapped micro-partitions $P_4$ 608 and $P_5$ 610 do not consume 100% their respective entitlements. Because only 5.5 ms of processor capacity is consumed by the dispatch of micro-partitions $P_1$ 602, $P_2$ 604, $P_3$ 606, $P_4$ 608, and $P_5$ 610, 4.5 ms of processor capacity is leftover, or unused, within dispatch window 600. Because only uncapped micro-partitions are capable of consuming additional processor cycles and micro-partition $P_3$ 606 consumed 100% of its entitlement, the partition management firmware gives micro-partition $P_3$ 606 priority to consume the unused processor cycles. If the partition management firmware once again dispatches uncapped micro-partition $P_3$ 606 and further time still remains within the dispatch window 600, uncapped micro-partition $P_3$ 606 again receives priority if micro-partition $P_3$ 606 is ready-to-run. If micro-partition $P_3$ 606 is not ready-to-run, then the partition management firmware applies the standard lottery scheme to a list of all uncapped micro-partitions within dispatch window 600 to distribute the unused processor cycles.

Figure 7:
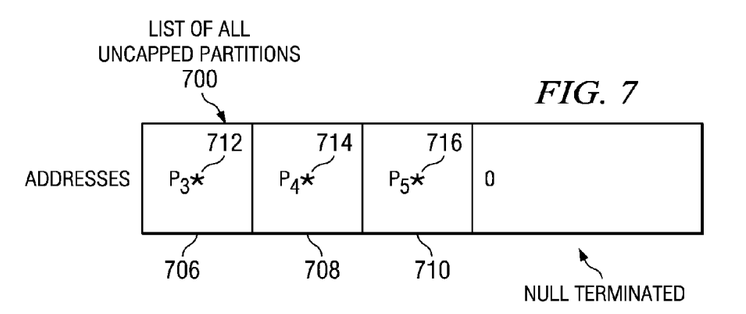
FIG. 7 is an exemplary list of all uncapped micro-partitions in a logically partitioned computer in accordance with illustrative embodiments.

With reference now to FIG. 7, an exemplary list of all uncapped micro-partitions in a logically partitioned computer is depicted in accordance with illustrative embodiments. List of all uncapped micro-partitions 700 may reside, for example, in a partition management firmware, such as partition management firmware 324 in FIG. 3. Alternatively, list of all uncapped micro-partitions 700 may reside in memory, such as main memory 208 in FIG. 2, or in any other memory or storage component capable of being utilized by illustrative embodiments.

List of all uncapped micro-partitions 700 lists all of the uncapped micro-partitions in a logically partitioned computer, such as logically partitioned computer 300 in FIG. 3. List of all uncapped micro-partitions 700 includes uncapped micro-partitions $P_3$ 706, $P_4$ 708, and $P_5$ 710, such as uncapped micro-partitions $P_3$ 406, $P_4$ 408, and $P_5$ 410 in FIG. 4. In addition, list of all uncapped micro-partitions 700 includes an address for each of uncapped micro-partitions $P_3$ 706, $P_4$ 708, and $P_5$ 710 indicated by superscript stars 712, 714, and 716. The partition management firmware uses addresses 712, 714, and 716 to locate entries for uncapped micro-partitions $P_3$ 706, $P_4$ 708, and $P_5$ 710 within an entitlement history table (see FIG. 9 below).

Figure 8:
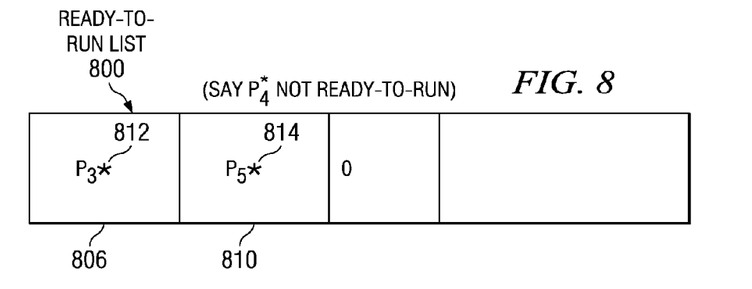
FIG. 8 is an exemplary list of ready-to-run uncapped micro-partitions within a dispatch window in accordance with illustrative embodiments.

With reference now to FIG. 8, an exemplary list of ready-to-run uncapped micro-partitions within a dispatch window is depicted in accordance with illustrative embodiments. Ready-to-run list 800 may reside, for example, in a partition management firmware, such as partition management firmware 324 in FIG. 3. Alternatively, ready-to-run list 800 may reside in memory, such as main memory 208 in FIG. 2, or in any other memory or storage component capable of being utilized by illustrative embodiments.

Ready-to-run list 800 lists all uncapped micro-partitions that are ready-to-run, or be dispatched, by the partition management firmware within the dispatch window, such as dispatch window 600 in FIG. 6. Ready-to-run list 800 includes ready-to-run uncapped micro-partitions $P_3$ 806 and $P_5$ 810. Ready-to-run uncapped micro-partitions $P_3$ 806 and $P_5$ 810 may be, for example, uncapped micro-partitions $P_3$ 706 and $P_5$ 710 in FIG. 7. In other words in this illustrative example, uncapped micro-partition $P_4$ 708 in FIG. 7 is not ready-to-run in the current dispatch window cycle. Ready-to-run list 800 also includes an address for each of uncapped micro-partitions $P_3$ 806 and $P_5$ 810 indicated by superscript stars 812 and 814. The partition management firmware uses addresses 812 and 814 to locate entries for uncapped micro-partitions $P_3$ 806 and $P_5$ 810 within an entitlement history table (see FIG. 9).

After compiling list of all uncapped micro-partitions 700 in FIG. 7 and ready-to-run list 800, the partition management firmware compares the two lists. If an uncapped micro-partition is listed in both the list of all uncapped micro-partitions and the ready-to-run list, then the partition management firmware calculates an average entitlement usage for each uncapped micro-partition listed in both lists. For example, uncapped micro-partitions $P_3$ 706 and $P_5$ 710 in FIG. 7 are the same as ready-to-run uncapped micro-partitions $P_3$ 806 and $P_5$ 810. Consequently, these uncapped micro-partitions are listed in both lists. As a result, the partition management firmware calculates the average entitlement usage for uncapped micro-partitions $P_3$ 806 and $P_5$ 810. The partition management firmware uses addresses 812 and 814 to locate all entries for uncapped micro-partitions $P_3$ 806 and $P_5$ 810 within the entitlement history table, shown in FIG. 9, to make this average entitlement usage calculation.

If the average entitlement usage calculation for an uncapped micro-partition is greater than or equal to a threshold value, then the partition management firmware lists that uncapped micro-partition in a candidate list (see FIG. 10), along with its respective average entitlement usage score. The threshold may be, for example, 100% usage. Of course illustrative embodiments are not limited to a 100% threshold. Illustrative embodiments may use any threshold value, such as, for example 50-150% usage.

Figure 9:
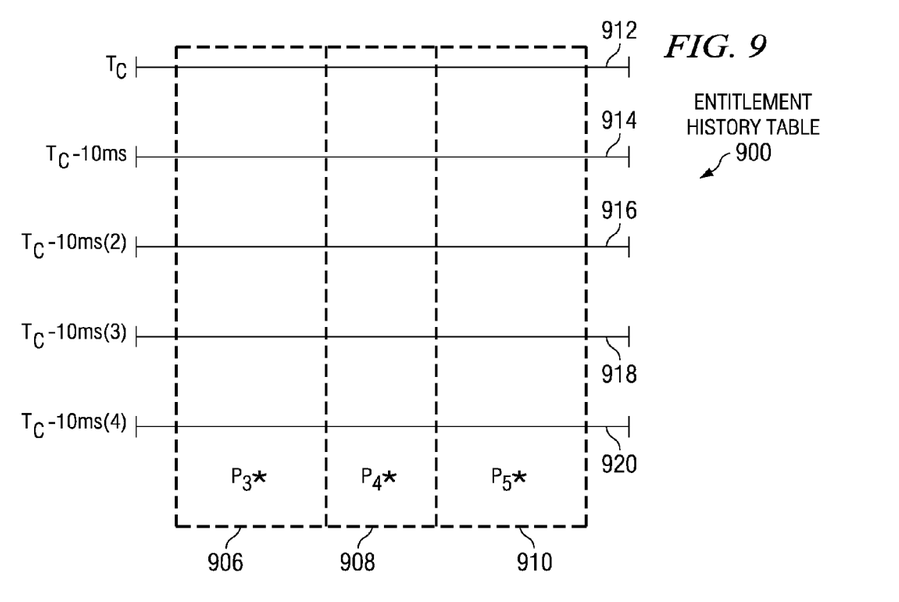
FIG. 9 is an exemplary entitlement history table for all uncapped micro-partitions in accordance with illustrative embodiments.

With reference now to FIG. 9, an exemplary entitlement history table for all uncapped micro-partitions is depicted in accordance with illustrative embodiments. Entitlement history table 900 may reside, for example, in a partition management firmware, such as partition management firmware 324 in FIG. 3. Alternatively, entitlement history table 900 may reside in memory, such as main memory 208 in FIG. 2, or in any other memory or storage component capable of being utilized by illustrative embodiments. Also, it should be noted that illustrative embodiments are not restricted to the use of a table to store entitlement histories of uncapped micro-partitions. Any form of structured or unstructured memory may be utilized by illustrative embodiments to store this data.

The partition management firmware stores the entitlement history for each uncapped micro-partition within a logically partitioned computer, such as logically partitioned computer 300 in FIG. 3, for X number of dispatch window cycles. The system administrator programs the specific number of dispatch window cycles that the partition management firmware stores in entitlement history table 900. In other words, the system administrator determines how many dispatch window cycles are necessary to properly calculate the average entitlement usage score for the uncapped micro-partitions. However, the more entries the partition management firmware uses to calculate the average entitlement usage score, the less sensitive, or reactive, the partition management firmware is to dispatching uncapped micro-partitions with "spiky" workloads to receive unused processor cycles within a dispatch window. As a result, the system administrator must be alert to a variety of workload conditions in order to appropriately program the number of entries within entitlement history table 900.

In addition to programming the number of dispatch window cycles that the entitlement history table contains, the system administrator also may assign a weight to each dispatch window cycle present in the entitlement history table. For example, the system administrator may assign the most recent or current dispatch window cycle within the entitlement history table more weight than the immediately preceding dispatch window cycle, the immediately preceding dispatch window cycle may receive more weight than the next preceding dispatch window cycle, and so on, until the programmed maximum number of dispatch window cycles is reached. In other words, illustrative embodiments using a weighted entitlement history table may place more weight, or importance, on the more recent micro-partition processor cycle consumption histories and less importance on older histories. By using a weighted entitlement history table, illustrative embodiments may be more reactive to uncapped micro-partitions with spiky workloads, while still maintaining tables with longer entitlement histories. As a result, illustrative embodiments are not limited to only calculating a straight average of all the micro-partition entitlement usage histories present in the entitlement history table.

Entitlement history table 900 contains five dispatch window cycles for uncapped micro-partitions $P_3$ 906, $P_4$ 908, and $P_5$ 910, such as uncapped micro-partitions $P_3$ 706, $P_4$ 708, and $P_5$ 710 in FIG. 7. Entitlement history table 900 is a first in first out (FIFO) stack of entries. In other words, the first entry in entitlement history table 900 is the first entry to be deleted after the maximum number of table entries is reached, which in this illustrative example is 5 entries. Because the system administrator in this illustrative example programmed entitlement history table 900 to list five dispatch window cycles for uncapped micro-partitions $P_3$ 906, $P_4$ 908, and $P_5$ 910, the partition management firmware places the current dispatch window cycle at the top of the table, increments each previous dispatch window cycle by one, and deletes the sixth entry.

For example, dispatch window cycle 912 is the fifth entry into entitlement history table 900 and is the current dispatch window cycle ($T_c$) for uncapped micro-partitions $P_3$ 906, $P_4$ 908, and $P_5$ 910. Dispatch window cycle 914 is the fourth entry and is the immediately preceding dispatch window cycle at $T_c$-10 ms. Dispatch window cycle 916 is the third entry and is the second oldest dispatch window cycle at $T_c$-10 ms(2) or $T_c$-20 ms. Dispatch window cycle 918 is the second entry and is the third oldest dispatch window cycle at $T_c$-10 ms(3) or $T_c$-30 ms. Dispatch window cycle 920 is the first entry and is the forth oldest dispatch window cycle at $T_c$-10 ms(4) or $T_c$-40 ms.

Consequently, when the partition management firmware enters the next current dispatch window cycle into entitlement history table 900 at $T_c$, the partition management firmware deletes the previous entry in dispatch window cycle 920 from entitlement history table 900. As stated previously, the partition management firmware uses the data contained within entitlement history table 900 to calculate the average entitlement usage for uncapped micro-partitions $P_3$ 906, $P_4$ 908, and $P_5$ 910, but only if uncapped micro-partitions $P_3$ 906, $P_4$ 908, and $P_5$ 910 are listed in both the list of all uncapped micro-partitions shown in FIG. 7 and the ready-to-run list shown in FIG. 8. As discussed in the example of FIG. 8, only uncapped micro-partitions $P_3$ 806 and $P_5$ 810 are listed in both lists. Uncapped micro-partitions $P_3$ 906 and $P_5$ 910 are the same as uncapped micro-partitions $P_3$ 806 and $P_5$ 810 in FIG. 8. Therefore, the partition management firmware only calculates the average entitlement usage for uncapped micro-partitions $P_3$ 906 and $P_5$ 910 using the data within entitlement history table 900.

Figure 10:
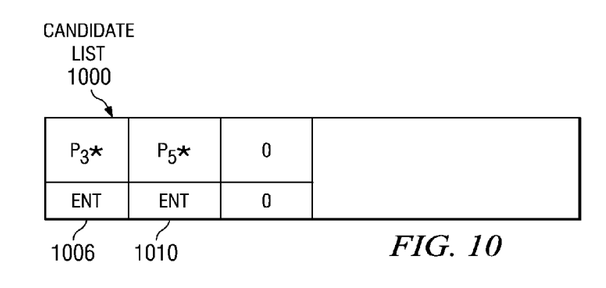
FIG. 10 is an exemplary candidate list in accordance with illustrative embodiments.

With reference now to FIG. 10, an exemplary candidate list is depicted in accordance with illustrative embodiments. Candidate list 1000 may reside, for example, in a partition management firmware, such as partition management firmware 324 in FIG. 3. Alternatively, candidate list 1000 may reside in memory, such as main memory 208 in FIG. 2, or in any other memory or storage component capable of being utilized by illustrative embodiments.

Candidate list 1000 lists all eligible candidates that may receive unused processor cycles within a dispatch window cycle. To be an eligible candidate, the partition management firmware must find an uncapped micro-partition listed in both the list of all uncapped micro-partitions shown in FIG. 7 and the ready-to-run list shown in FIG. 8. In addition, the partition management firmware must calculate an average entitlement usage score greater than or equal to the threshold for each uncapped micro-partition listed in both lists. If an uncapped micro-partition meets the criteria above, then the partition management firmware places that particular uncapped micro-partition in candidate list 1000.

In this illustrative example, the partition management firmware lists uncapped micro-partitions $P_3$ 1006 and $P_5$ 1010, such as uncapped micro-partitions $P_3$ 906 and $P_5$ 910 in FIG. 9, in candidate list 1000. Thus, uncapped micro-partitions $P_3$ 1006 and $P_5$ 1010 are listed in both the list of all uncapped micro-partitions shown in FIG. 7 and the ready-to-run list shown in FIG. 8 and have a calculated average entitlement usage score greater than or equal to the threshold value.

Figure 11:
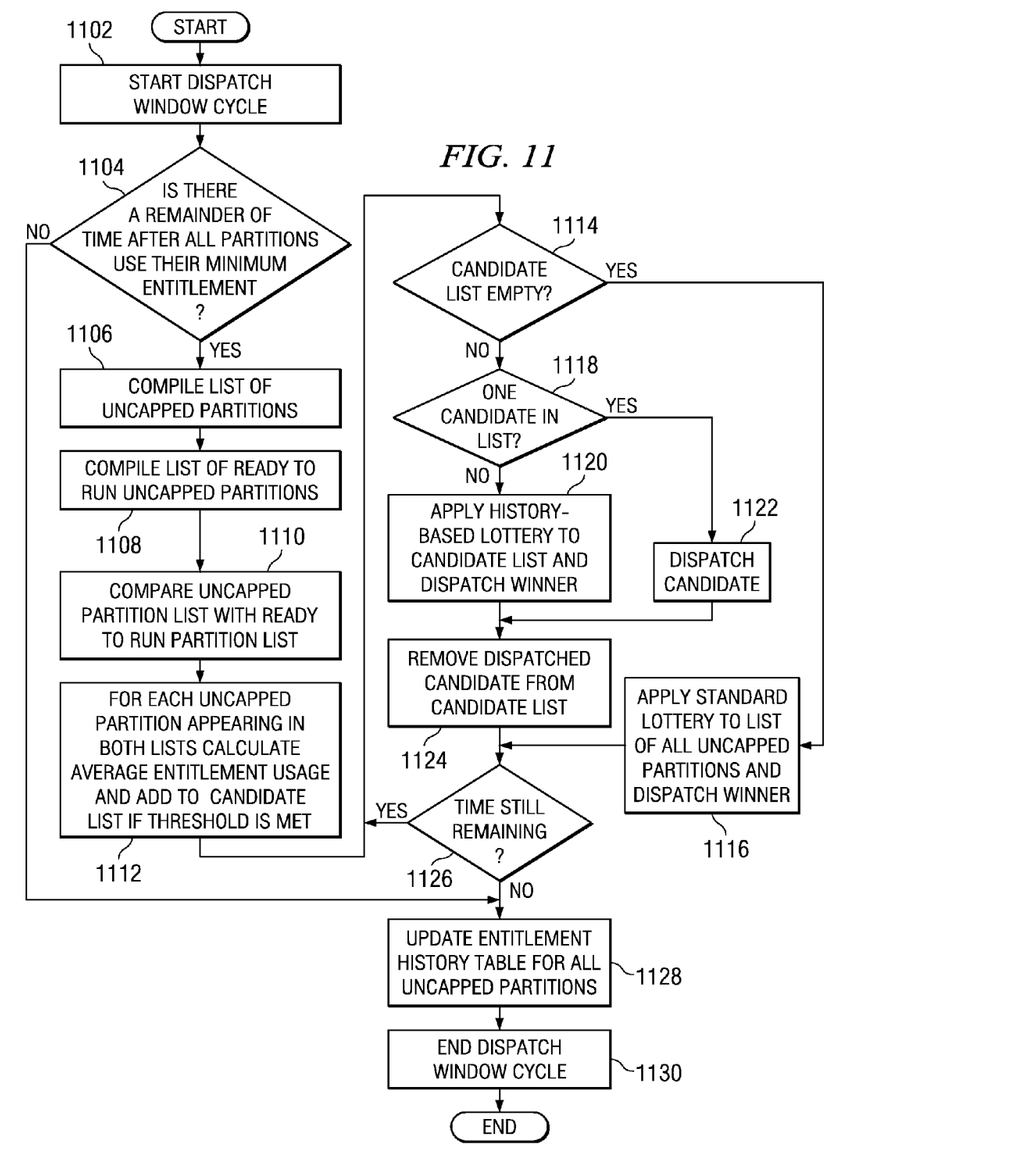
FIG. 11 is a flowchart illustrating an exemplary process for dynamically distributing unused processor cycles within a dispatch window in accordance with illustrative embodiments.

With reference now to FIG. 11, a flowchart illustrating an exemplary process for dynamically distributing unused processor cycles within a dispatch window is shown in accordance with illustrative embodiments. The process shown in FIG. 11 may be implemented in a partition management firmware, such as, for example, partition management firmware 324 in FIG. 3.

The process begins when the partition management firmware starts a dispatch window cycle (step 1102). Subsequent to starting the dispatch window cycle in step 1102, the partition management firmware makes a determination as to whether a remainder of time exists after all micro-partitions use their minimum entitlement of processor capacity (step 1104). If a remainder of time does not exist, no output of step 1104, then the process proceeds to step 1128 where the partition management firmware updates the entitlement history table for all uncapped micro-partitions. If a remainder of time does exist, yes output of step 1104, then the partition management firmware compiles a list of all uncapped micro-partitions in this dispatch window cycle (step 1106).

Subsequent to, or concurrent with, compiling the list of all uncapped micro-partitions in this dispatch window cycle in step 1106, the partition management firmware compiles a list of all ready-to-run uncapped micro-partition within this dispatch window cycle (step 1108). After compiling the lists of all uncapped micro-partitions and ready-to-run uncapped micro-partitions in steps 1106 and 1108, the partition management firmware compares the list of all uncapped micro-partitions with the list of ready-to-run uncapped micro-partitions (step 1110). After comparing both lists in step 1110, the partition management firmware calculates an average entitlement usage percentage for each uncapped micro-partition that appears in both the list of all uncapped micro-partitions and the list of ready-to-run micro-partitions. Alternatively, the partition management firmware may calculate a scaled score instead of a raw percentage score. If the average entitlement usage is greater than or equal to a threshold, which may be, for example, 1 scaled or 100% raw usage, then the partition management firmware adds an entry in a candidate list for each uncapped micro-partition that meets the threshold (step 1112).

Subsequent to calculating the average entitlement usage for each uncapped micro-partition that is listed in both the list of all uncapped micro-partitions and the list of ready-to-run uncapped micro-partitions in step 1112, the partition management firmware makes a determination as to whether the candidate list contains no entries or is empty (step 1114). If the candidate list is empty, yes output of step 1114, then the partition management firmware applies a standard lottery process to the list of all uncapped partitions and dispatches a winner to consume unused processor cycles within the dispatch window (step 1116). After dispatching the winner of the standard lottery process from the list of all uncapped micro-partitions in step 1116, the process proceeds to step 1126 where the partition management firmware makes a determination as to whether time still remains within the dispatch window.

If the candidate list is not empty, no output of step 1114, then the partition management firmware makes a determination as to whether the candidate list contains only one entry or candidate (step 1118). If the candidate list does not contain only one entry, no output of step 1118, then the partition management firmware applies a history-based lottery process to the candidate list and dispatches a winner to consume unused processor cycles within the dispatch window (step 1120). After dispatching the history-based lottery winner from the candidate list in step 1120, the process proceeds to step 1124 where the partition management firmware removes the dispatched candidate from the candidate list.

If the candidate list does only contain one entry, yes output of step 1118, then the partition management firmware dispatches the only candidate in the candidate list to consume unused processor cycles within the dispatch window (step 1122). Subsequent to dispatching the only candidate in the candidate list in step 1122, the partition management firmware removes the dispatched candidate from the candidate list (step 1124). After removing the dispatched candidate from the candidate list in step 1124, the partition management firmware makes a determination as to whether time still remains within the dispatch window (step 1126).

If time still remains within the dispatch window, yes output of step 1126, then the process returns to step 1114 where the partition management firmware makes a determination as to whether the candidate list is empty. If time does not still remain within the dispatch window, no output of step 1126, then the partition management firmware updates an entitlement history table for all uncapped partitions (step 1128). Subsequent to updating the entitlement history table in step 1128, the partition management firmware ends the dispatch window cycle (step 1130). The process terminates thereafter.

Figure 12:
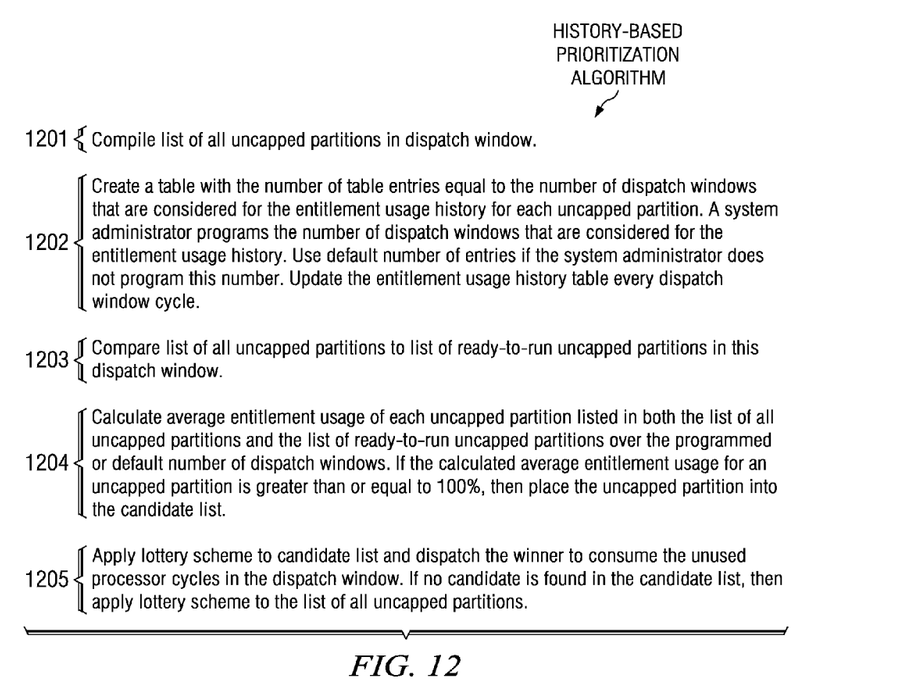
FIG. 12 is an exemplary algorithm for dynamically distributing unused processor cycles in accordance with an illustrative embodiment.

With reference now to FIG. 12, an exemplary algorithm for dynamically distributing unused processor cycles is shown in accordance with an illustrative embodiment. Illustrative embodiments may locate exemplary history-based prioritization algorithm 1200 within, for example, a partition management firmware, such as partition management firmware 324 in FIG. 3. However, illustrative embodiments are not limited to locating algorithm 1200 within the partition management firmware. Illustrative embodiments may locate algorithm 1200 in any component within the computer capable of storing algorithm 1200. Alternatively, algorithm 1200 may reside in a network data processing system connected to the computer that utilizes algorithm 1200.

It should be noted that algorithm 1200 is only intended as an example of one type of algorithm that may be utilized by illustrative embodiments for dynamically distributing unused processor cycles of a micro-partitioned processor within a dispatch window. Illustrative embodiments are not restricted to the use of algorithm 1200. Any algorithm capable of accomplishing processes of an illustrative embodiment may be used.

Algorithm 1200 contains five basic steps. Step 1201: compile list of all uncapped partitions in dispatch window. Step 1202: create a table with the number of table entries equal to the number of dispatch windows that are considered for the entitlement usage history for each uncapped micro-partition. A system administrator programs the number of dispatch windows that the partition management firmware considers for the entitlement usage history calculation. Use default number of entries if the system administrator does not program this number. Update the entitlement usage history table every dispatch window cycle. Step 1203: compare list of all uncapped micro-partitions to list of ready-to-run uncapped micro-partitions in this dispatch window. Step 1204: calculate average entitlement usage of each uncapped micro-partition listed in both the list of all uncapped micro-partitions and the list of ready-to-run uncapped micro-partitions over the programmed or default number of dispatch windows. If the calculated average entitlement usage for an uncapped micro-partition is greater than or equal to 100%, then place that particular uncapped micro-partition into the candidate list. Step 1205: apply history-based lottery process to candidate list and dispatch the winner to consume the unused processor cycles in the dispatch window. If no candidate is found in the candidate list, then apply standard lottery process to the list of all uncapped partitions.

However, it should also be noted that illustrative embodiments are not limited to a five-step algorithm. Illustrative embodiments may utilize algorithms containing more or fewer steps depending upon implementation of each illustrative embodiment. While giving preference to the busiest of all micro-partitions, algorithm 1200 is sensitive to: 1) the list of all uncapped micro-partitions, which the system administrator may add or remove uncapped micro-partitions from the list at any time; 2) the recent usage history of competing uncapped micro-partitions; and 3) the system administrator assigned weight of each competing uncapped micro-partition.

Thus, illustrative embodiments provide a computer implemented method, system, and computer useable program code for dynamically distributing unused processor cycles within a dispatch window to the busiest uncapped partitions. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing processor cycles, the computer implemented method comprising:
    determining whether unused processor cycles of a logically micro-partitioned processor are present in a dispatch window after all capped micro-partitions and uncapped micro-partitions within the logically micro-partitioned processor have received their respective entitlement of processor cycles;
    responsive to a determination that unused processor cycles are present in the dispatch window, identifying a set of uncapped micro-partitions that are ready to be re-dispatched during the dispatch window from a list of all the uncapped micro-partitions within the logically micro-partitioned processor to form an identified set of micro-partitions;
    calculating an average entitlement usage score for each micro-partition in the identified set of micro-partitions over a predefined plurality of previous dispatch window cycles;
    identifying a number of candidate micro-partitions from the identified set of micro-partitions based on the average entitlement usage score calculated for each micro-partition in the identified set of micro-partitions, wherein the average entitlement usage score is greater than or equal to a threshold to identify the number of candidate micro-partitions;
    selecting a micro-partition from the number of candidate micro-partitions based on a lottery process of the candidate micro-partitions;
    dispatching the micro-partition selected from the number of candidate micro-partitions based on the lottery process to consume the unused processor cycles present in the dispatch window; and
    determining whether additional unused processor cycles are still present in the dispatch window after the dispatching of the micro-partition selected from the number of candidate micro-partitions based on the lottery process.

2. The computer implemented method of claim 1, further comprising:
    removing the micro-partition selected based on the lottery process from the number of candidate micro-partitions; and
    updating an entitlement history table for all the uncapped micro-partitions.

3. The computer implemented method of claim 2, wherein a number of dispatch window cycle entries for all the uncapped micro-partitions present in the entitlement history table is programmable.

4. The computer implemented method of claim 3, wherein the number of dispatch window cycle entries for all the uncapped micro-partitions present in the entitlement history table are used for calculating the average entitlement usage score for each micro-partition in the identified set of micro-partitions to form a calculated average entitlement usage score.

5. The computer implemented method of claim 4, wherein the lottery process uses the calculated average entitlement usage score and an assigned weight for each micro-partition in the identified set of micro-partitions to select the micro-partition from the number of candidate micro-partitions.

6. The computer implemented method of claim 3, wherein each dispatch window cycle present in the entitlement history table has an assigned weight.

7. The computer implemented method of claim 1, further comprising:
    responsive to the number of candidate micro-partitions having no uncapped micro-partitions, applying a standard lottery process to the list of all the uncapped micro-partitions; and
    dispatching a winner of the standard lottery process from the list of all the uncapped micro-partitions to consume the unused processor cycles present in the dispatch window.

8. The computer implemented method of claim 1, wherein a partition management firmware uses an algorithm to perform the determining, identifying, calculating, selecting, and dispatching steps.

9. The computer implemented method of claim 8, wherein the algorithm resides in the partition management firmware, and wherein the partition management firmware is a hypervisor.

10. The computer implemented method of claim 1, wherein the average entitlement usage must be score is greater than or equal to 100 percent usage to identify the number of candidate micro-partitions.

11. The computer implemented method of claim 1, wherein a duration of the dispatch window is in a range from 1 millisecond to 20 milliseconds.

12. The computer implemented method of claim 1, wherein a capped micro-partition does not exceed its entitlement of processor cycles within a dispatch window cycle, and wherein an uncapped micro-partition may exceed its entitlement of processor cycles within the dispatch window cycle if the uncapped micro-partition uses at least 100 percent of its entitlement of processor cycles during the dispatch window cycle.

13. A computer implemented method within a data processing system for distributing unused processor cycles within a dispatch window, the computer implemented method comprising:
    determining whether time remains in the dispatch window after all capped micro-partitions and uncapped micro-partitions within a logically micro-partitioned processor have used their respective minimum entitlement of processor cycles;
    responsive to determining that time remains in the dispatch window after all the capped micro-partitions and the uncapped micro-partitions have used their respective minimum entitlement of processor cycles, calculating an average entitlement usage score over a predefined plurality of previous dispatch window cycles for each uncapped micro-partition that is ready to be re-dispatched within the dispatch window to form a calculated average entitlement usage score for each uncapped micro-partition;

adding each uncapped micro-partition that is ready to be re-dispatched within the dispatch window to a candidate list if the calculated average entitlement usage score of the uncapped micro-partition meets a threshold;

dispatching a winning candidate of a history-based process from the candidate list to consume the unused processor cycles within the dispatch window; and determining whether additional time remains in the dispatch window after the dispatching of the winning candidate of the history-based process from the candidate list.

14. A data processing system for managing processor cycles, comprising:

a bus system;

a storage device connected to the bus system, wherein the storage device stores a set of instructions; and a logically micro-partitioned processing unit connected to the bus system, wherein the logically micro-partitioned processing unit executes the set of instructions to determine whether unused processor cycles are present in a dispatch window after all capped micro-partitions and uncapped micro-partitions within the logically micro-partitioned processing unit have received their respective entitlement of processor cycles; identify a set of uncapped micro-partitions that are ready to be re-dispatched during the dispatch window from a list of all the uncapped micro-partitions within the logically micro-partitioned processing unit to form an identified set of micro-partitions in response to a determination that unused processor cycles are present in the dispatch window; calculate an average entitlement usage score for each micro-partition in the identified set of micro-partitions over a predefined plurality of previous dispatch window cycles; identify a number of candidate micro-partitions from the identified set of micro-partitions based on the average entitlement usage score calculated for each micro-partition in the identified set of micro-partitions, wherein the average entitlement usage score is greater than or equal to a threshold to identify the number of candidate micro-partitions; select a micro-partition from the number of candidate micro-partitions based on a lottery process of the candidate micro-partitions; dispatch the micro-partition selected from the number of candidate micro-partitions based on the lottery process to consume the unused processor cycles present in the dispatch window; and determine whether additional unused processor cycles are still present in the dispatch window after the dispatching of the micro-partition selected from the number of candidate micro-partitions based on the lottery process.

15. The data processing system of claim 14, wherein the logically micro-partitioned processing unit executes a further set of instructions to remove the micro-partition selected based on the lottery process from the number of candidate micro-partitions; and update an entitlement history table for all the uncapped micro-partitions.

16. The data processing system of claim 14, wherein the logically micro-partitioned processing unit executes a further set of instructions to apply a standard lottery process to the list of all the uncapped micro-partitions in response to the number of candidate micro-partitions having no uncapped micro-partitions; and dispatch a winner of the standard lottery process from the list of all the uncapped micro-partitions to consume the unused processor cycles present in the dispatch window.

17. A computer program product stored on a computer storage having computer usable program code embodied thereon that is executable by a computer for managing processor cycles, the computer program product comprising:

computer usable program code configured to determine whether unused processor cycles of a logically micro-partitioned processor are present in a dispatch window after all capped micro-partitions and uncapped micro-partitions within the logically micro-partitioned processor have received their respective entitlement of processor cycles;

computer usable program code configured to identify a set of uncapped micro-partitions that are ready to be re-dispatched during the dispatch window from a list of all the uncapped micro-partitions within the logically micro-partitioned processor to form an identified set of micro-partitions in response to a determination that unused processor cycles are present in the dispatch window;

computer usable program code configured to calculate an average entitlement usage score for each micro-partition in the identified set of micro-partitions over a predefined plurality of previous dispatch window cycles;

computer usable program code configured to identify a number of candidate micro-partitions from the identified set of micro-partitions based on the average entitlement usage score calculated for each micro-partition in the identified set of micro-partitions wherein the average entitlement usage score is greater than or equal to a threshold to identify the number of candidate micro-partitions;

computer usable program code configured to select a micro-partition from the number of candidate micro-partitions based on a lottery process of the candidate micro-partitions;

computer usable program code configured to dispatch the micro-partition selected from the number of candidate micro-partitions based on the lottery process to consume the unused processor cycles present in the dispatch window; and computer usable program code configured to determine whether additional unused processor cycles are still present in the dispatch window after the dispatching of the micro-partition selected from the number of candidate micro-partitions based on the lottery process.

18. The computer program product of claim 17, further comprising:

computer usable program code configured to remove the micro-partition selected based on the lottery process from the number of candidate micro-partitions; and computer usable program code configured to update an entitlement history table for all the uncapped micro-partitions.

19. The computer program product of claim 17, further comprising:

computer usable program code configured to apply a standard lottery process to the list of all the uncapped micro-partitions in response to the number of candidate micro-partitions having no uncapped micro-partitions; and computer usable program code configured to dispatch a winner of the standard lottery process from the list of all the uncapped micro-partitions to consume the unused processor cycles present in the dispatch window.

20. The computer program product of claim 19, further comprising:
computer usable program code configured, responsive to determining that additional unused processor cycles are still present in the dispatch window after the dispatching of the micro-partition selected from the number of candidate micro-partitions based on the lottery process, to dispatch a subsequent uncapped micro-partition to consume the additional unused processor cycles still present in the dispatch window.

* * * * *